UNITED STATES PATENT OFFICE.

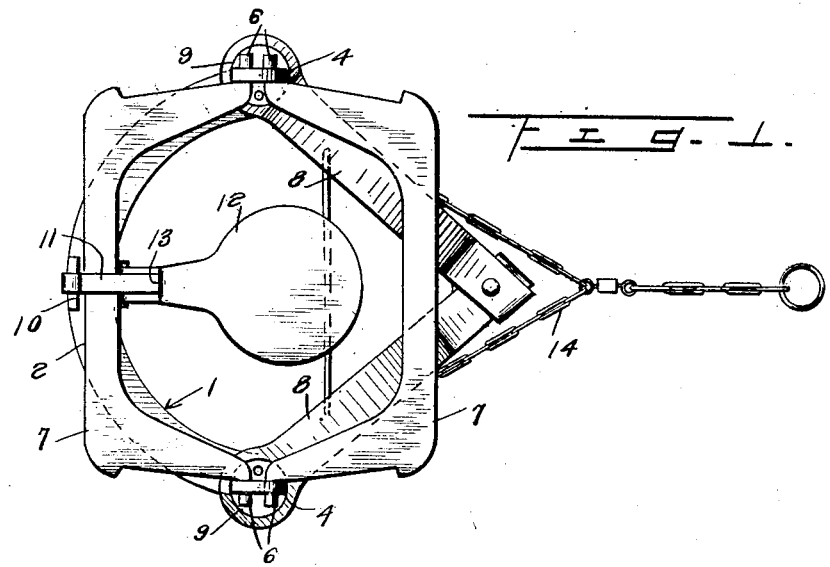
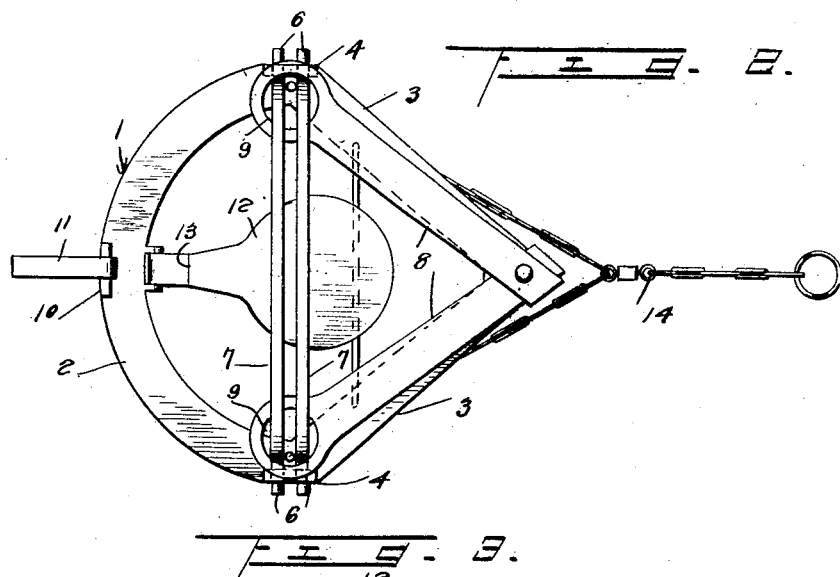
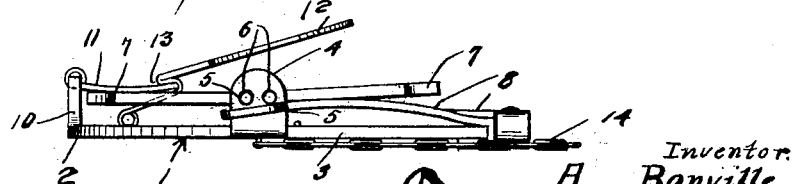

AMOS BONVILLE, OF MERCER, WISCONSIN.

ANIMAL-TRAP.

1,370,512.  Specification of Letters Patent.  Patented Mar. 8, 1921.

Application filed June 18, 1919. Serial No. 305,128.

*To all whom it may concern:*

Be it known that I, AMOS BONVILLE, a citizen of the United States, residing at Mercer, in the county of Iron and State of Wisconsin, have invented certain new and useful Improvements in Animal-Traps; and I do hereby declare the following to be a full, clear, and exact description of the invention, such as will enable others skilled in the art to which it appertains to make and use the same.

This invention relates to new and useful improvements in animal or game traps of the jaw type and has for one of its objects the provision of a spring construction that will act on each end of the jaws and which will not interfere with the trip mechanism so that the animal will be caught at a considerable distance upwardly on the legs thereby insuring a firm grip on the animal by the trap.

Another object of this invention is the provision of a base that will permit the location of the trip mechanism at a lower point in relation to the jaws over that of similarly constructed traps so that the liability of the animal's foot being thrown upwardly during the tripping of the trap is obviated, permitting the jaws to obtain a firm grip on the upper portion of the animal's leg.

A further object of this invention is the provision of a trap of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawing, in which:

Figure 1 is a plan view of a trap illustrating the jaws in a set position,

Fig. 2 is a similar view with the jaws in a tripped position, and

Fig. 3 is a side elevation illustrating the device in a set position.

Referring in detail to the drawings, the numeral 1 indicates the base consisting of an arcuate shaped portion 2 having formed upon its ends converging arms 3. The ends of the arms are overlapped and secured together in any well known manner. Upstanding ears 4 are formed upon the base 1 at the point of formation of the arms to the ends of the arcuate shaped portion 2 and are provided with openings 5 to receive the ends or pintles 6 of the jaws 7. The jaws are provided with the usual gripping portions and are adapted to be moved into engagement with each other under the influence of springs 8 when released from a set position so as to firmly grip the leg of an animal. The springs 8 are secured together and also to the overlapped ends of the arms 3 and said springs overlie and extend parallel with said arms having in their free ends slots or openings 9 adapted to have the ends of the jaws 7 extend therethrough. The springs 8 are of the leaf type and which normally have a tendency to extend upwardly from the arms 3 so as to force the jaws into engagement with each other when free. It will be seen from the construction of the springs that each jaw is provided with a tension means at each end so as to cause said jaws to efficiently grip an animal.

An upstanding ear 10 is formed upon the arcuate shaped portion 2 of the body 1 and has pivoted thereto a tongue or catch 11. The arcuate shaped portion 2 has pivoted thereto a trip member 12 provided with a shoulder 13 to be engaged by the catch. The catch member is adapted to overlie one of the jaws and engage said shoulder so as to hold the jaws in a set position and also hold the springs downwardly against the arms 3 of the base so that an animal stepping upon the trip member 12 will free the shoulder from the tongue or catch member permitting the jaws to move in engagement with each other under the influence of the springs 8. As the jaws move into engagement with each other they grip the animal's leg at a point considerably upward from the foot thus insuring a firm hold or grip upon the animal. The base is provided with the usual anchoring chain 14 adapted to be connected to a permanent object to prevent the trap from being dragged away by the animal.

A bar is secured to the base 1 and underlies the trip member and is adapted to limit the downward movement of said trip member when the jaws are freed.

While I have shown and described the preferred embodiment of my invention, it will be understood that minor changes in construction, combination and arrangement of parts may be made without departing from the spirit and scope of the invention as claimed.

Having thus described my invention, what I claim is:—

A trap comprising an arcuate shaped portion, converging arms formed integrally with the ends of said portion and having their ends secured together and projecting in an opposite direction from the arcuate shaped portion, jaws pivoted to the ends of the arcuate shaped portion and adapted to be positioned horizontally when set, a trip means carried by the arcuate shaped portion for holding the jaws set and disposed in the space between said arms and the arcuate shaped portion, and converging leaf springs overlying the arms and extending substantially parallel therewith and having one of their ends arranged in overlapping relation and secured to the attached ends of the arms and having openings in their other ends adapted to receive the pivotal connections of the jaws to the arcuate shaped portions and bearing against the under faces of the jaws at their pivotal ends.

In testimony whereof I affix my signature in presence of two witnesses.

AMOS BONVILLE.

Witnesses:
 ED SILBERG,
 RUTH BALL.